US011479371B1

(12) United States Patent
Perry (10) Patent No.: US 11,479,371 B1
(45) Date of Patent: Oct. 25, 2022

(54) LOAD TESTING FOR FLIGHT CONTROL SURFACE

(71) Applicant: Pauline Perry, San Diego, CA (US)

(72) Inventor: Pauline Perry, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1115 days.

(21) Appl. No.: 16/376,236

(22) Filed: Apr. 5, 2019

(51) Int. Cl.
*G01N 3/34* (2006.01)
*B64F 5/60* (2017.01)
*B64C 9/00* (2006.01)

(52) U.S. Cl.
CPC .............. *B64F 5/60* (2017.01); *B64C 9/00* (2013.01); *G01N 3/34* (2013.01)

(58) Field of Classification Search
CPC ............. B64F 5/60; B64C 9/00; G01N 3/34
See application file for complete search history.

(56) References Cited

U.S. PATENT DOCUMENTS

| | | | |
|---|---|---|---|
| 2,321,875 A | 10/1940 | Temple | |
| 3,919,884 A | * 11/1975 | Gunderson | G01N 3/02 73/831 |
| 4,979,700 A | 12/1990 | Tiedeman et al. | |
| 5,624,160 A | 4/1997 | Koch et al. | |
| 7,155,982 B2 | 1/2007 | Oesmann et al. | |
| 2005/0109118 A1* | 5/2005 | Oesmann | G01N 3/24 73/841 |
| 2016/0377517 A1 | 12/2016 | Taba et al. | |

FOREIGN PATENT DOCUMENTS

CN           214578162 U   * 11/2021

* cited by examiner

*Primary Examiner* — Jamel E Williams
(74) *Attorney, Agent, or Firm* — Tarolli, Sundheim, Covell & Tummino LLP (57) ABSTRACT

A load testing apparatus can include a plurality of vertical load structures arranged on a flight control surface to provide torque on the control surface and reacted by a control rod of the flight control surface. The load testing apparatus can also include a plurality of fore/aft load structures arranged to provide tensile and/or compressive force in a direction intersecting a hinge line of the flight control surface. Each of the plurality of fore/aft load structure can include a first rubber pad having a surface extending in a first plane that is arranged to contact a lower surface of the flight control surface. Each of the plurality of fore/aft load structures can also include a first rubber pad having a surface extending in a second plane that is arranged to contact an upper surface of the flight control surface, wherein the first plane and the second plane are non-parallel planes.

20 Claims, 6 Drawing Sheets

LOAD TESTING FOR FLIGHT CONTROL SURFACE

GOVERNMENT INTEREST

The invention was made under Government Contract Number N00019-08-C-0023. Therefore, the US Government has rights to the invention as specified in that contract.

TECHNICAL FIELD

This disclosure relates to load testing. More particularly, this disclosure relates to a load testing apparatus for a flight control surface.

BACKGROUND

Many types of machinery, engines, structures and motors are load tested. The load may be at a designated safe working load (SWL), full load, or at an aggravated level of load. The governing contract, technical specification or test method contains the details of conducting the test. The purpose of a mechanical load test is to verify that all the component parts of a structure including materials, base-fixings are fit for task and loading for an associated design.

Aircraft control surfaces, including aileron, elevators, rudders and ruddervators are tested through the application of loads (forces) on the aircraft control surfaces. In particular, servo-controlled linear or rotary hydraulic actuators apply the test loads or displacements during static and fatigue testing of the aircraft control surfaces. Load control for fatigue applications is typically accomplished using cyber computer-controlled servo feedback control systems or a structural test controllers.

SUMMARY

One example relates to a load testing apparatus that includes a plurality of vertical load structures arranged on a flight control surface to provide torque on the flight control surface and reacted by a control rod of the flight control surface. The load testing apparatus can also include a plurality of fore/aft load structures arranged to provide tensile and/or compressive force in a direction intersecting a hinge line of the flight control surface. Each of the plurality of fore/aft load structure can include a first rubber pad having a surface extending in a first plane that is arranged to contact a lower surface of the flight control surface. Each of the plurality of fore/aft load structures can also include a second rubber pad having a surface extending in a second plane that is arranged to contact an upper surface of the flight control surface, wherein the first plane and the second plane are non-parallel planes.

Another example relates to a load testing apparatus that includes a plurality of vertical load structures arranged on a flight control surface to provide torque on the flight control surface and reacted by a control rod of the flight control surface. The load testing apparatus also includes a plurality of fore/aft load structures arranged to provide tensile and/or compressive force in a direction intersecting a hinge line of the flight control surface, wherein the tensile and/or compressive force and the torque on the control rod are nearly independent of each other.

Yet another example relates to a load testing apparatus that includes a plurality of vertical load structures arranged on a flight control surface to provide torque on the flight control surface and reacted by a control rod of the flight control surface. Each of the plurality of vertical load structures can include a rubber pad that is bonded to the flight control surface with an adhesive to prevent relative movement between the rubber pad and the flight control surface. The load testing apparatus also includes a plurality of fore/aft load structures arranged to provide tensile and/or compressive force in a direction perpendicular to the vertical load structures and intersecting the hinge line of the flight control surface. Each of the plurality of fore/aft structures can include a first pad formed of a rubber material extending in a first plane that is arranged to contact a lower surface of the flight control surface. Each of the plurality of fore/aft structures can also include a second pad formed of the rubber material extending in a second plane that is arranged to contact an upper surface of the flight control surface. The first plane and the second plane are non-parallel planes. The load testing apparatus can further include a first set of actuators that applies a compressive force on the plurality of vertical load structures, and the plurality of vertical load structures induces a torque on the flight control surface and reacted by the control rod. The load testing apparatus still further includes a second set of actuators that applies a tensile and/or a compressive force on the plurality of fore/aft load structures, and the plurality of fore/aft load structures transfers the tensile and/or compressive force to the flight control surface, wherein the first set of actuators and the second set of actuators operate contemporaneously.

DETAILED DESCRIPTION

The examples described herein relate to an apparatus for conducting a load test on a flight control surface of an aircraft. The apparatus includes a plurality of vertical load structures arranged on the flight control surface. Each of the plurality of vertical load structures can convert a compressive force or a tensile force applied by an actuator arm to the flight control surface into a torque (e.g., a moment arm) on the flight control surface and reacted by a control rod that controls a position of the flight control surface.

The load testing apparatus also includes a plurality of fore/aft (e.g., forward and backwards) load structures arranged along the flight control surface of the aircraft. Each of the plurality of fore/aft load structures transfers a tensile and/or a compressive force applied by an actuator arm to the flight control surface to induce a tensile and/or compressive force in a direction intersecting a hinge line of the flight control surface and in a direction perpendicular to the vertical load structures. As used herein, the term "hinge line" is defined as the line of rotation for the flight control surface.

The torque applied by the plurality of vertical load structures is decoupled from the tensile and/or compressive force applied by the plurality of fore/aft load structures and vice versa. In this manner, such torque and tensile and/or compressive forces can be applied contemporaneously during a load test (e.g., a static test or fatigue test) of the aircraft. Moreover, different torque intensities and/or different intensities of the tensile and/or compressive force can be applied during the load test without the need to reposition the plurality of vertical load structures, the plurality of fore/aft load structures and/or the flight control surface. In this manner, downtime for realignment and/or reconfiguration of the load testing apparatus and/or the flight control surface can be curtailed to mitigate an overall testing time of the flight control surface.

Figure 1:
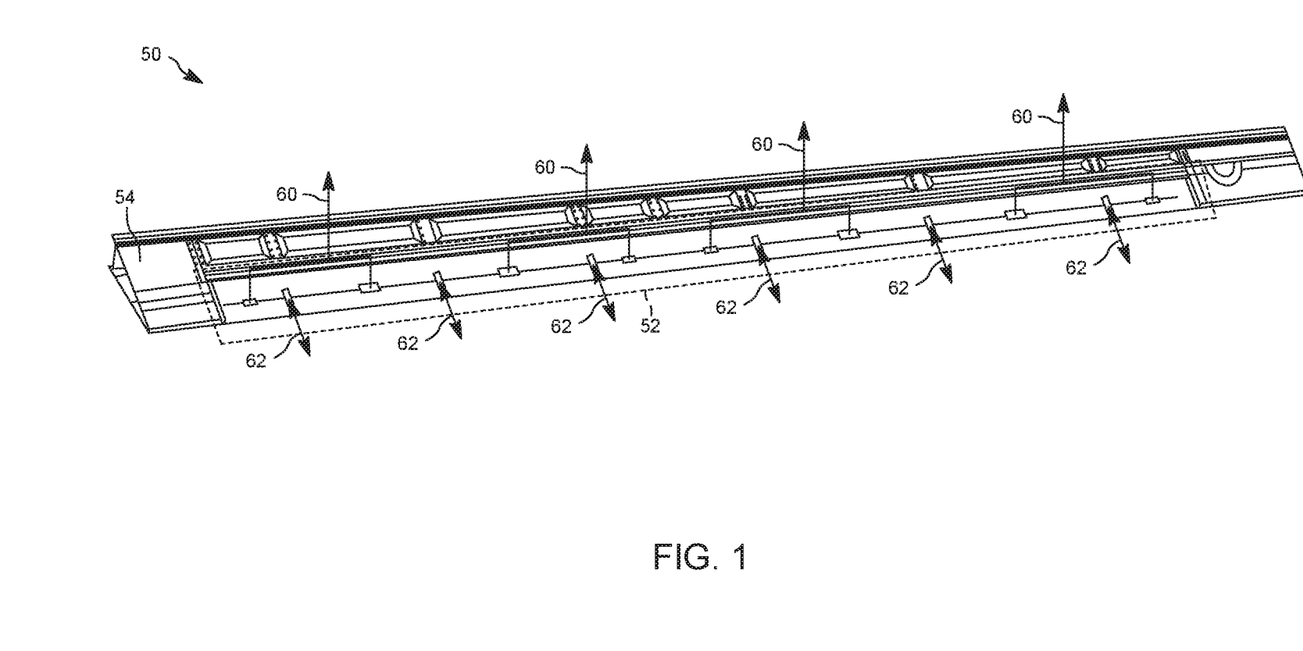
FIG. 1 illustrates an example of a load testing apparatus for a flight control surface of an aircraft.

FIG. 1 illustrates an example of a load testing apparatus 50 for administering load testing to a flight control surface 52 of an aircraft. As used herein, the term "flight control surface" refers to a surface of an aircraft that is implemented as an aerodynamic device that allows a pilot to adjust and control an aircraft's flight attitude. The flight control surface 52 illustrated in FIG. 1 is representative of an aileron of a wing 54 the aircraft. However, as is demonstrated herein, the flight control surface 52 can alternatively be implemented as an elevator, a rudder or a ruddervator on a tail of an aircraft.

The load testing apparatus 50 includes a plurality of vertical load testing structures 60 positioned on the flight control surface 52. As discussed herein, the plurality of vertical load structures 60 induce a torque (moment arm) on a control surface and reacted by a control rod of the flight control surface. The load testing apparatus 50 also includes a plurality of fore/aft load structures 62 positioned on the flight control surface 52. As discussed herein, the fore/aft load structures 62 apply a tensile and/or a compressive force in a fore and/or aft direction (front and/or back direction) of the aircraft. As is illustrated, the vertical load testing structures 60 and the fore/aft load structures 62 are arranged in an intervening pattern. However, in other examples, other patterns are possible.

Figure 2:
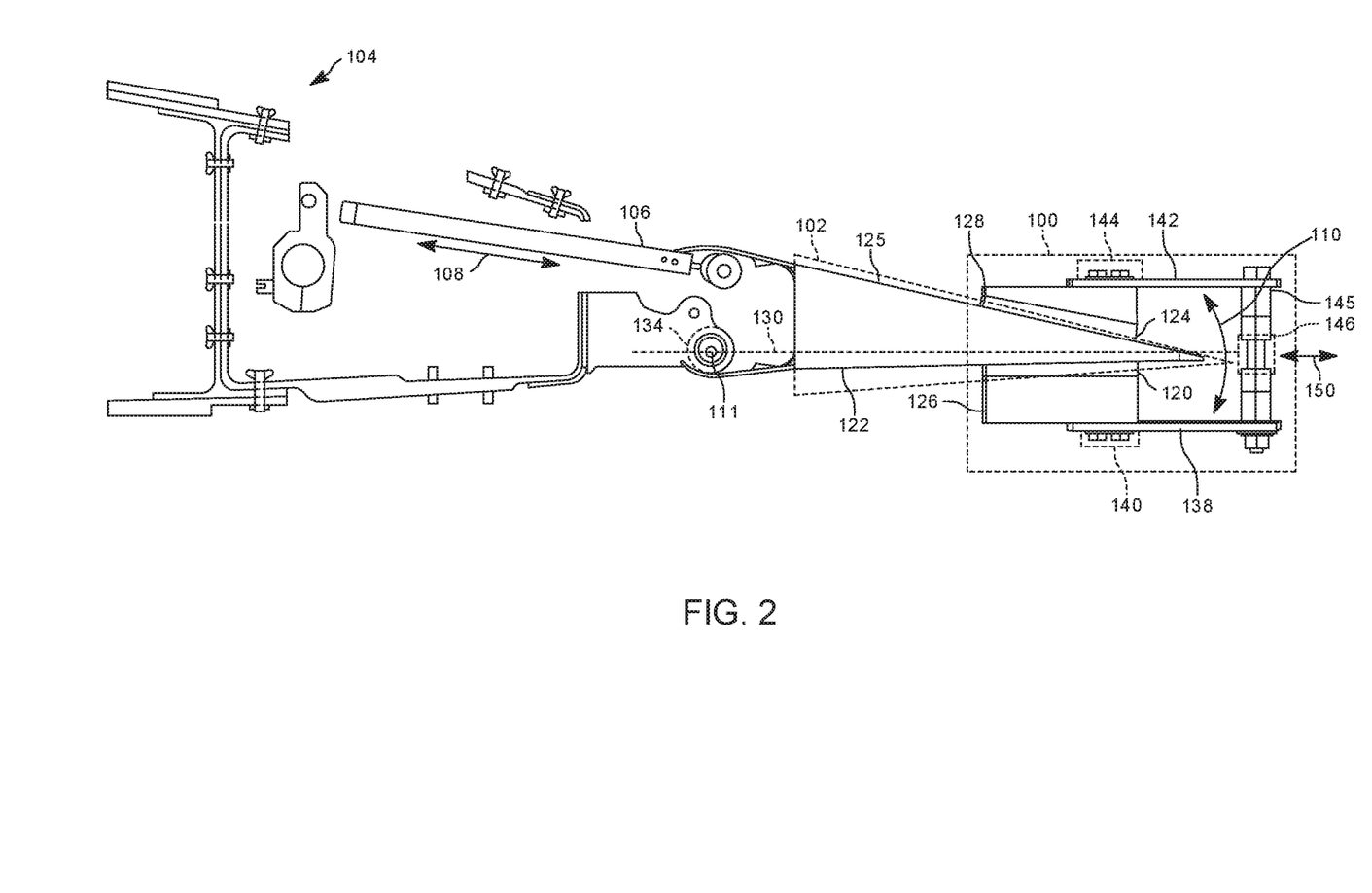
FIG. 2 illustrates an example of a fore/aft load testing structure.

FIG. 2 illustrates a cross sectional view of a fore/aft load structure 100 that is employable as one of the fore/aft load structures 62 of FIG. 1. The fore/aft load structure 100 is positioned on a flight control surface 102 of a wing 104 of an aircraft. Similar to FIG. 1, the flight control surface 102 of FIG. 2 is illustrated as an aileron.

The wing 104 includes a control rod 106 that is movable in directions indicated by an arrow 108. During aircraft operation, movement of the control rod 106 causes an edge the flight control surface 102 to move in directions indicated by the arrow 110, which denotes an arc of rotation about a hinge line 111. During flight, air passing over the wing applies a force on the flight control surface 102. Moreover, the force applied to the flight control surface varies as a function of the position of the flight control surface 102. The fore/aft load structure 100 is configured to simulate a portion of that force in a manner described herein.

The fore/aft load structure 100 includes a first rubber pad 120 having a surface that extends in a first plane and is arranged to contact a lower surface 122 of the flight control surface 102. As used herein, the term "rubber" refers to any elastic material (natural or synthetic) with properties that has been modified to increase toughness and/or resistance to wear. The fore/aft load structure 100 also includes a second rubber pad 124 having a surface that extends in a second plane and is arranged to contact an upper surface 125 of the flight control surface 102. The first plane and the second plane are non-parallel planes, such that the surface of the first rubber pad 120 and the second rubber pad 124 for are arranged at an acute angle with respect to each other. Stated differently, the first rubber pad 120 and the second rubber pad 124 are arranged in a wedge configuration, and the first rubber pad 120 and the second rubber pad 124 are separated by the flight control surface 102. The first rubber pad 120 and the second rubber pad 124 can be bonded with an adhesive to prevent relative movement between the flight control surface 125 and the fore/aft load structure 100.

A first surface of a first wedge structure 126 can be adhered to the first rubber pad 120. A second surface of the first wedge structure 126 opposes the first surface of the first wedge structure 126. The first wedge structure 126 is arranged such that a second surface of the first surface of the first wedge structure 126 extends in a direction parallel to a fore/aft load line 130 of the flight control surface 102. The fore/aft load line 130 extends in a direction perpendicular to and intersects with the hinge line 111. As noted, the hinge line 111 defines as a line of rotation for the flight control surface 125. Moreover, the hinge line 111 defines a line created from each point of rotation in the wing 104. Additionally, the hinge line 111 intersects a center of a hinge 134. In a three-dimensional space, the hinge line 111 extends in and out of the surface depicting FIG. 1. In other words, the hinge line 111 extends in and out of the page depicting FIG. 1. The flight control surface 102 of the wing 104 is configured to pivot about the hinge line 111 to move the flight control surface 102 in the direction indicated by the arrow 110.

A first surface of a second wedge structure 128 can be adhered to the second rubber pad 124. A second surface of the second wedge structure 128 opposes the first surface of the second wedge structure 128. Similar to the first wedge structure 126, the second wedge structure 128 is arranged such that a second surface of the second structure 128 extends in a direction parallel to the fore/aft load line 130 of the flight control surface 102.

A first elongated member 138 can be attached to the first wedge structure 126 via fasteners 140 (e.g., bolts) at the second surface of the first wedge structure 126. A second elongated member 142 can be attached to the second wedge structure 128 via fasteners 144 (e.g. bolts) at the second surface of the second wedge structure 128.

A third elongated member 145 can extend between the first elongated member 138 and the second elongated member 142. The third elongated member 145 can be implemented as a bolt (or similar device) that can be securely fastened to the first elongated member 138 and the second elongated member 142. The third elongated member 145 can include an attachment region 146 that is attachable to an actuator arm. The actuator arm is driven by an actuator and is configured to apply a positive pull (e.g., a tensile force) or a negative pull (e.g., compressive force or a "push") on the attachment region 146 of the fore/aft load structure 100 in a direction indicated by the arrow 150. The arrow 150 is parallel and in-line with the fore/aft load line 130 of the flight control surface 102 to prevent inducement of a moment arm on the flight control surface 104.

The fore/aft load structure 100 transfers the positive or negative pull (e.g., tensile force or compressive force) to the first rubber pad 120 and the second rubber pad 124, which in turn transfers force to the lower surface 122 and the upper surface 125 of the flight control surface 102. However, due to the shape of the first rubber pad 120 and the second rubber pad 124, along with the shape of the first wedge structure 126 and the second wedge structure 128, the net force on the flight control surface 150 is nearly entirely (e.g., 98% or more) in the direction indicated by the arrow 150. In particular, nearly '0' torque (moment arm) is applied to the flight control surface 104 reacted by the control rod 106

(e.g., 2% or less). Additionally, due to the wedge shape formed by the fore/aft load structure, in some examples, nearly equal tensile and/or compressive force (e.g., within about 2%) is applied to the lower surface 122 and the upper surface 125 of the flight control surface 102.

Figure 3:
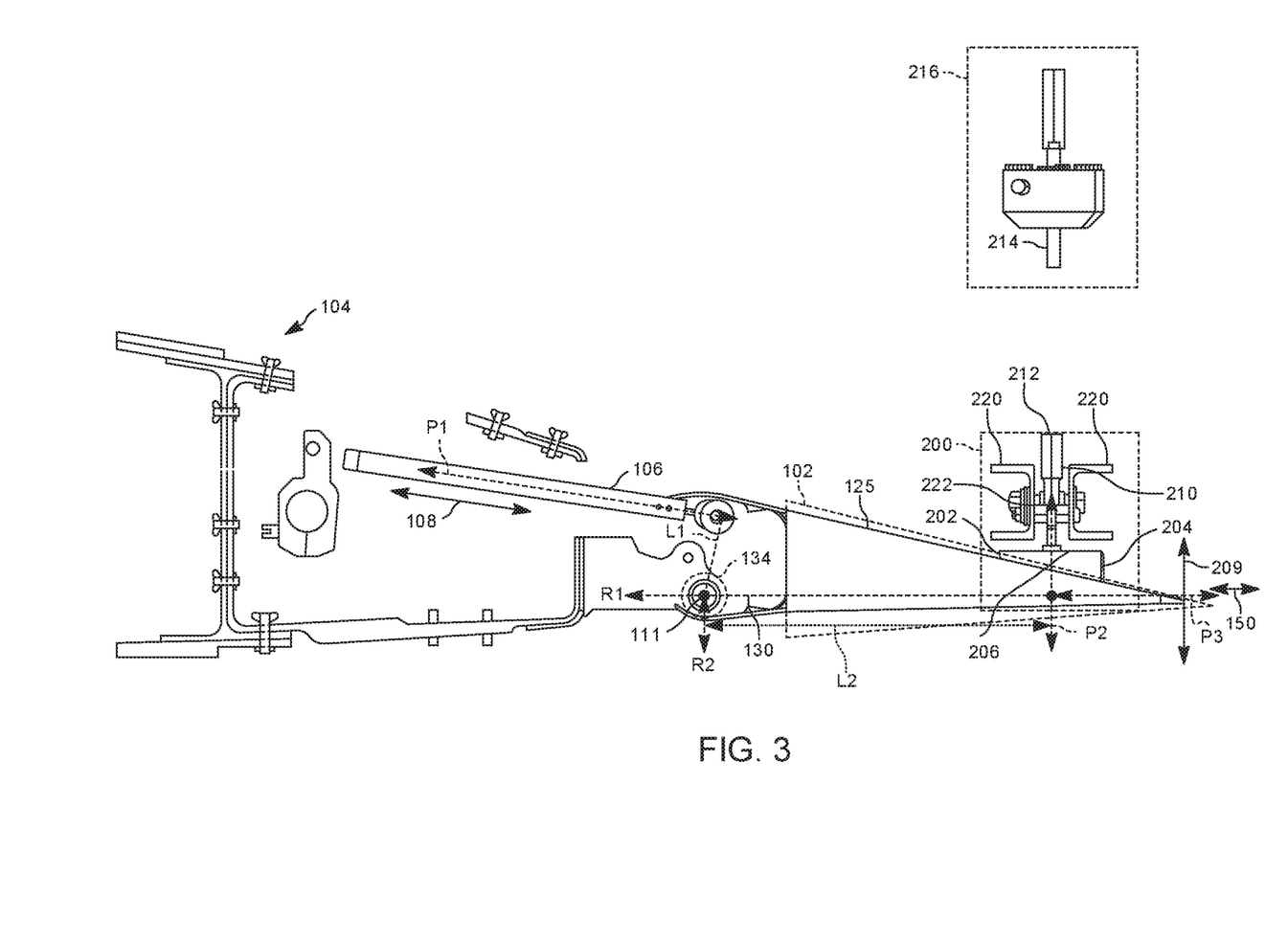
FIG. 3 illustrates an example of a vertical load testing structure.

FIG. 3 illustrates a cross sectional view of a vertical load structure 200 that is employable as one of the vertical load structures 60 of FIG. 1. For purposes of simplification of explanation, FIGS. 2 and 3 employ the same reference numbers to refer to the same structure. Additionally, structures with the same reference numbers are not reintroduced.

The vertical load structure 200 includes a rubber pad 202 that is positioned on the upper surface 125 of the flight control surface 102. The rubber pad 202 includes a surface that extends in a plane parallel to the upper surface 125. The rubber pad 202 is bonded to the upper surface 125 of the flight control surface 102 (e.g., with an adhesive) to prevent relative movement between the flight control surface 102 and the vertical load structure 200.

The vertical load structure 200 can include a wedge structure 204 that is adhered to the rubber pad 202. The wedge structure 204 is shaped to offset an angle of the rubber pad 202, such that a top surface 206 of the wedge structure 204 extends in a plane parallel to the fore/aft load line 130 and perpendicular to the direction indicated by an arrow 209, which is perpendicular to the fore/aft load line 130. The vertical load structure 200 also includes an elongated member 210 that extends from the top surface 206 of the wedge structure 204 in the direction perpendicular to the fore/aft load line 130. A top portion 212 of the elongated member 210 is shaped to receive a tip 214 of an actuator arm 216 that is driven by an actuator.

In some examples, the elongated member 210 can be attached to a set of rails 220 that extend between two instances of the vertical load structure 200. Thus, the elongated member 210 can extend in a direction perpendicular to the fore/aft load line 130, namely in the direction indicated by the arrow 209. A platform 222 can extend between the set of rails 220 to provide a surface for the elongated member 210. Including the set of rails 220 and the platform 222 allows a single instance of the actuator arm 216 to control the force applied by at least two instances of the vertical load structure 200.

The vertical load structure 200 is configured to convert compressive or tensile force applied by the tip 214 of the actuator arm 216 into a force that is perpendicular to the shortest distance to the hinge line 111, such as a direction indicated by the arrow 209. Accordingly, force in the direction of the arrow 209 injects a torque (moment arm) on the flight control surface 104 and reacted by the control rod 106. More particularly, forces applied by the tip 214 of the actuator arm 216 onto the wing 104 are described with respect to Equations 1-3.

$$\Sigma M_H = 0 \quad \text{Equation 1:}$$

$$0 = (P1 * L1) + (P2 * L2) \quad \text{Equation 2:}$$

$$P1 = -P2 * \left(\frac{L2}{L1}\right) \quad \text{Equation 3}$$

wherein:
  $M_H$ is a moment at the hinge line 111;
  P1 is the load on the control rod 106;
  P2 is the vertical load;
  P3 is the fore/aft load;
  R1 and R2 are hinge reaction loads;
  L1 is the shortest perpendicular distance between the hinge line 111 and the load on the control rod (P1); and
  L2 is the shortest perpendicular distance between the hinge line 111 and the vertical applied load P2.

As demonstrated by Equations 1-3, since the force is nearly perpendicular to the direction indicated by the arrow 150, nearly '0' force (e.g., less than 2%) is applied in the direction parallel to the fore/aft load line 130.

Referring back to FIG. 1, as demonstrated in FIG. 2, each of the plurality of fore/aft load structures 62 can apply a tensile and/or a compressive force in the fore/aft (forward and backwards) direction of the wing 54 of the aircraft. Additionally, the plurality of fore/aft load structures 62 apply nearly '0' torque on a control rod (hidden from view in FIG. 1) of the flight control surface 52. Contemporaneously, as demonstrated in FIG. 3, each of the vertical load structures 60 can apply a torque (moment arm) on the control surface and reacted by a control rod of the flight control surface 52. Moreover, each of the vertical load structures 60 applies a nearly '0' force in the fore/aft direction of the flight control surface 52. In this manner, the forces applied by the plurality of vertical load structures 60 are decoupled from the forces applied by the plurality of fore/aft load structures 62 and vice versa. That is, the torque (moment arm) applied by the vertical load structures 60 and the tensile and/or compressive forces applied by the plurality of fore/aft load structures 62 are independent or nearly independent of each other.

In operation, during load testing (e.g., static or fatigue testing), hundreds or thousands of intensities of the torque are applied by the plurality of vertical load structures 60 in response to forces from a first set of actuators (via corresponding actuator arms), and physical responses of the flight control surface 52 can be measured. Contemporaneously with the torque applied by the vertical load structures 60, during testing, hundreds or thousands of intensities the tensile and/or compressive forces are applied by the plurality of fore/aft load structures 62 in response to forces from a second set of actuators (via corresponding actuator arms), and physical responses of the flight control surface 52 can be measured. In fatigue tests, anywhere form hundreds, thousands or even millions of test cycles could be applied in an attempt to discover any structural weaknesses in the test article (the flight control surface 52), including fatigue initiation sites.

By employment of the load testing apparatus 50 of FIG. 1, a full load test can be executed without the need to reposition the vertical load structures 60, the fore/aft load structures 62 and/or the flight control surface 52. In this manner, downtime between applications of force (torque and tensile or compressive force) can be curtailed. Accordingly, the overall time for a load test can be mitigated.

Figure 4:
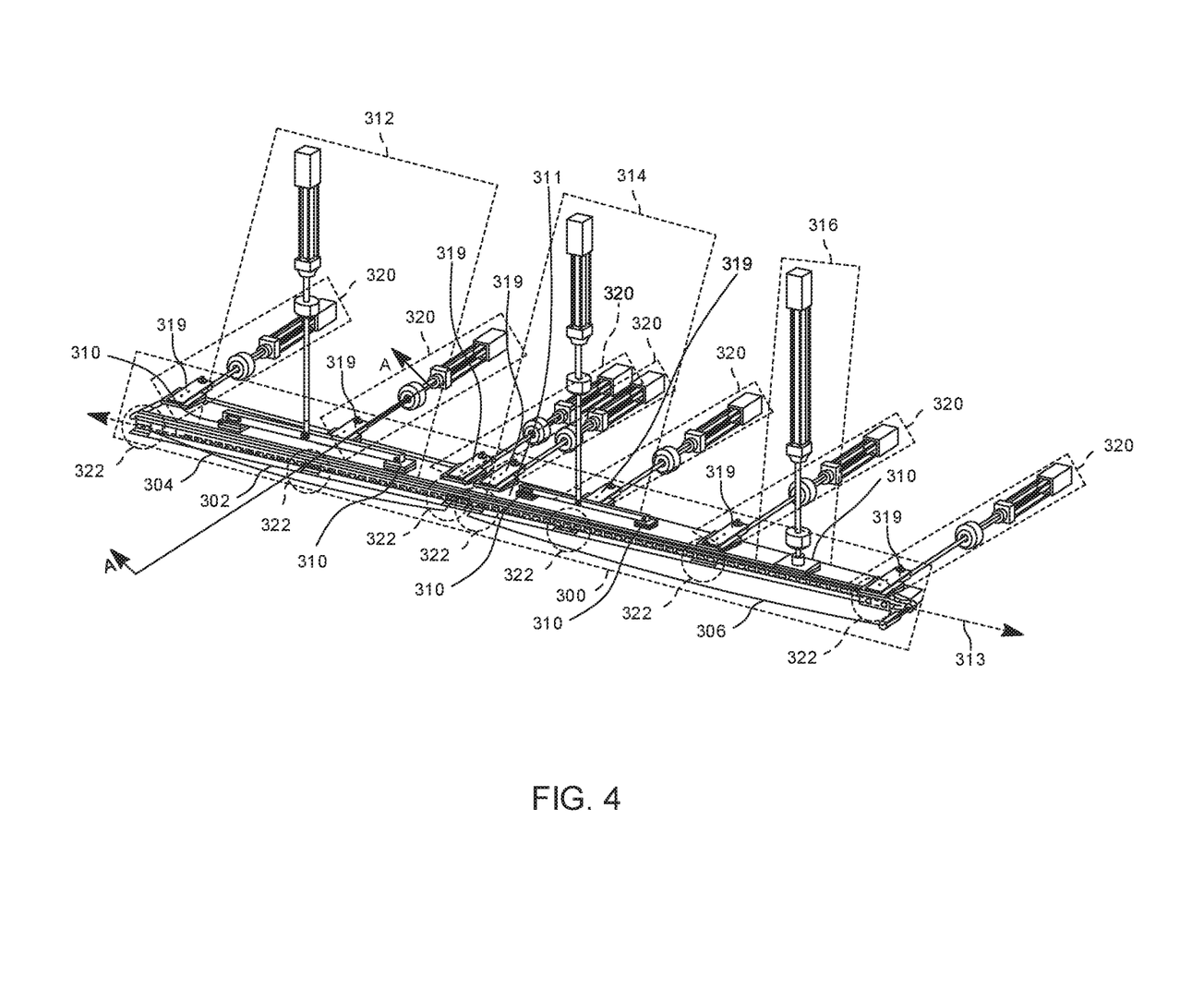
FIG. 4 illustrates another example of a load testing apparatus for a flight control surface of an aircraft.

FIG. 4 illustrates an example of a load testing apparatus 300 that is attached to a ruddervator 302 of a tail of an aircraft. The ruddervator 302 includes an inboard portion 304 that is proximal to the tail of the aircraft and an outboard portion 306 that is distal from the tail of the aircraft.

The load testing apparatus 300 includes a plurality of vertical load structures 310 positioned about the length of the ruddervator 302. The plurality of vertical load structures 310 are coupled to a flight control surface 311 of the ruddervator 302 (e.g., the moveable edge). In the example illustrated, there are five vertical load structures 310. However, there could be more or less vertical load structures 310 depending on a length of the ruddervator 302. Moreover, the vertical load structures 310 are unevenly spaced. Each of the vertical load structures 310 can be implemented in a manner similar to the vertical load structure 200 of FIG. 3. The flight control surface 311 is configured to rotate about a hinge line 313. The hinge line 313 connects a center of rotation for driver and idler hinges.

In the illustrated example, the first two of the vertical load structures 310 are tethered together with a set of rails and are controlled by a single actuator arm as indicated by 312. Similarly, the second two of the vertical load structures 310 are also tethered together with a set of rails and are controlled by a single actuator arm, as indicated by 314. Further, the fifth of the vertical load structures 310 is controlled by another actuator arm as indicated by 316.

The load testing apparatus 300 also includes a plurality of fore/aft load structures 319 coupled to the flight control surface 311 of the ruddervator 302. In the example illustrated, each fore/aft load structure 319 is proximal to a respective hinge 322. Each of the fore/aft load structures 319 depicts an attached actuator arm as indicated by the reference number 320, but it is understood that the actuator arm can be disconnected from the fore/aft load structures 319.

Figure 5:
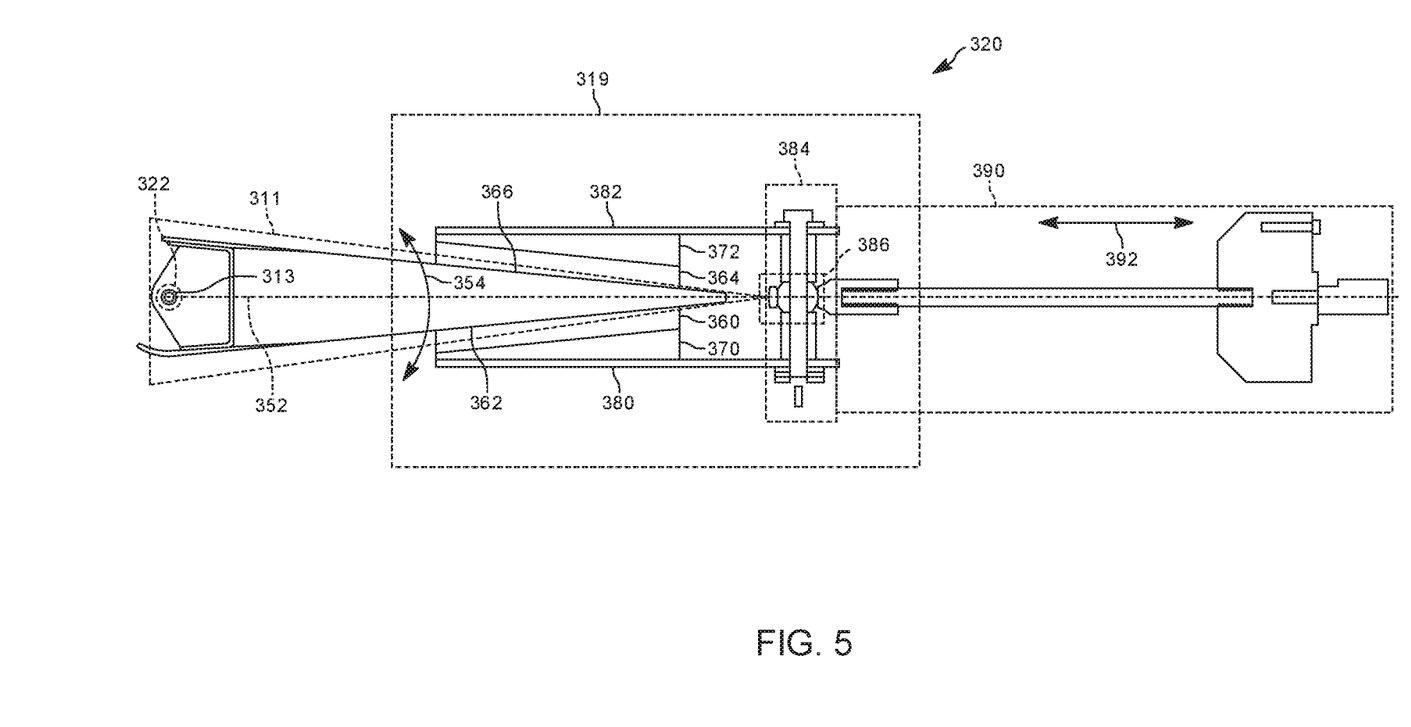
FIG. 5 illustrates an example of a fore/aft load testing structure illustrated in FIG. 4.

FIG. 5 illustrates a cross sectional view of the load testing apparatus 300 of FIG. 4 taken along line A-A. For purposes of simplification of explanation, the same reference numbers are employed in FIGS. 4 and 5 to denote the same structure. FIG. 5 illustrates a fore/aft load structure 319.

The flight control surface 311 pivots about the hinge 322. The hinge line 313 of the flight control surface 311 extends from a center of the hinge 322. The hinge line 313 extends in a three-dimensional direction of the surface depicting FIG. 3. In other words, the hinge line 350 extends in and out of the page depicting FIG. 3. A fore/aft load line 352 extends in a direction in-line to the hinge 322 and in a direction perpendicular to the hinge line 313. The flight control surface 311 of the ruddervator is configured to pivot about the hinge line 313 to move an edge of the flight control surface 311 in the direction indicated by the arrow 354 which defines an arc of rotation about the center of the hinge 313. During flight, air passing over the ruddervator 302 applies a force on the flight control surface 311. Moreover, the force applied to the flight control surface 311 varies as a function of the position of the flight control surface 311. The fore/aft load structure 319 is configured to simulate a portion of that force in a manner described herein.

The fore/aft load structure 319 includes a first rubber pad 360 having a surface that extends in a first plane and is arranged to contact a lower surface 362 of the flight control surface 311. The fore/aft load structure 319 also includes a second rubber pad 364 having a surface that extends in a second plane and is arranged to contact an upper surface 366 of the flight control surface 311. The first plane and the second plane are non-parallel planes, such that the surface of the first rubber pad 360 and the second rubber pad 364 are arranged at an acute angle with respect to each other. Stated differently, the first rubber pad 360 and the second rubber pad 364 are arranged in a wedge configuration, and the first rubber pad 360 and the second rubber pad 364 are separated by the flight control surface 311. Moreover, in the example illustrated, the fore/aft load line 352 bisects the acute angle formed by the first rubber pad 360 and the second rubber pad 364.

A first surface of a first wedge structure 370 can be adhered to the first rubber pad 360. A second surface of the first wedge structure 370 opposes the first surface of the first wedge structure 370. The first wedge structure 370 is arranged such that a second surface of the first wedge structure 370 extends in a direction parallel to a fore/aft load line 352 of the flight control surface 311. Similarly, a first surface of a second wedge structure 372 can be adhered to the second rubber pad 364. A second surface of the second wedge structure 372 opposes the first surface of the second wedge structure 372. Similar to the first wedge structure 370, the second wedge structure 372 is arranged such that a second surface of the second wedge structure 372 extends in a direction parallel to the fore/aft load line 352 of the flight control surface 311.

A first elongated member 380 can be attached to the first wedge structure 370 via fasteners (e.g., bolts) at the second surface of the first wedge structure 370. A second elongated member 382 can be attached to the second wedge structure 372 via fasteners (e.g. bolts) at the second surface of the second wedge structure 372.

A third elongated member 384 can extend between the first elongated member 380 and the second elongated member 382. The third elongated member 384 can be implemented as a bolt (or similar device) that can be securely fastened to the first elongated member 380 and the second elongated member 382. The third elongated member 384 can include an attachment region 386 that is attachable to an actuator arm 390. The actuator arm 390 is configured to apply a positive pull (e.g., a tensile force) or a negative pull (e.g., compressive force or a "push") on the attachment region 386 of the fore/aft load structure 319 in a direction indicated by the arrow 392. The arrow 392 is parallel and in-line with the fore/aft load line 352 of the flight control surface 102.

The fore/aft load structure 319 transfers the positive or negative pull (e.g., tensile force or compressive force) to the first rubber pad 360 and the second rubber pad 364, which in turn transfers force to the lower surface 362 and the upper surface 366 of the flight control surface 311. However, due to the shape of the first rubber pad 360 and the second rubber pad 364, along with the shape of the first wedge structure 370 and the second wedge structure 372, nearly all of the net force (e.g., 98% or more) on the flight control surface 311 is in the direction indicated by the arrow 392. In particular, nearly '0' torque (moment arm) (e.g., less than 2% of the net force) is applied to the control rod (not shown). Moreover, due to the wedge shape of the fore/aft load structure 319, nearly equal tensile and/or compressive force (e.g., within about 2%) is applied to the lower surface 362 and the upper surface 366 of the flight control surface 311.

Referring back to FIG. 4, in operation, during load testing, hundreds or thousands of intensities of the torque are applied by the plurality of vertical load structures 312, and physical responses of the flight control surface 311 can be measured. Contemporaneously with the torque applied by the vertical load structures 312, during testing, hundreds or thousands of intensities the tensile and/or compressive force are applied by the plurality of fore/aft load structures 319, and physical responses of the flight control surface 311 can be measured. In fatigue tests, anywhere from hundreds, thousands or even millions of test cycles could be applied in an attempt to discover any structural weaknesses in the test article (the flight control surface 311), including fatigue initiation sites.

By employment of the load testing apparatus 300 of FIG. 4, a full load test can be executed without the need to reposition the vertical load structures 312, 314 and 316 and/or the fore/aft load structures 319. In this manner, downtime between applications of force (torque and tensile or compressive force) can be curtailed. Accordingly, the overall time for a load test can be mitigated.

Figure 6:
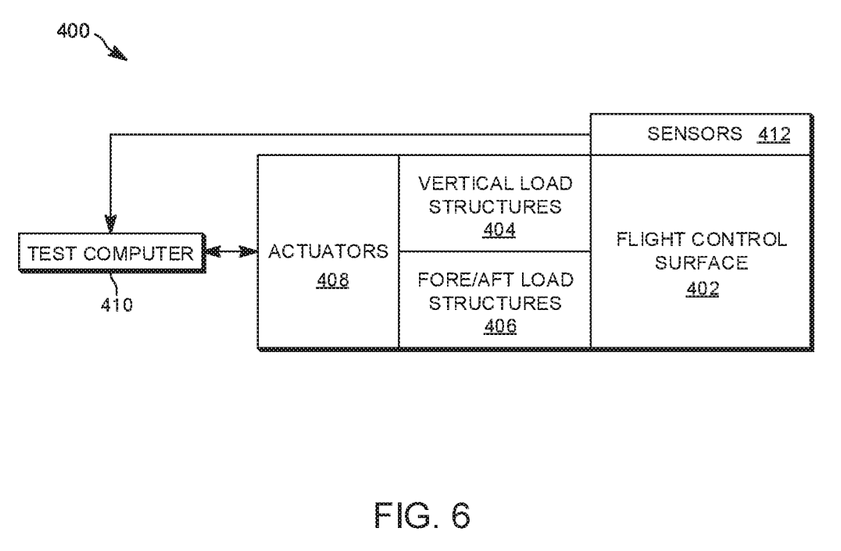
FIG. 6 illustrates an example of a system for implementing a load test on a flight control surface for an aircraft.

FIG. 6 illustrates an example of a system 400 for executing a load test on a flight control surface 402. The load test can be a static force test or a fatigue test. Moreover, the flight control surface 402 can be an aileron of a wing of an aircraft. Alternatively, the flight control surface 402 can be on a tail of the aircraft, such as on a ruddervator, an elevator or a rudder.

A plurality of vertical load structures 404 and a plurality of fore/aft load structures 406 can be positioned on the flight control surface 402, such as shown and described with respect to FIGS. 1-5. Additionally, each of a plurality of actuators 408 can (via an actuator arm) apply a force to a respective vertical load structure 404 (or multiple vertical load structures) or a respective fore/aft load structure 406. That is, a first set of the actuators 408 applies a force to respective vertical load structures 404 and a second set of the actuators 408 applies a force to respective fore/aft load structures 406. The actuators 408 can be implemented as servomotors or hydraulic actuators (or a combination thereof) coupled to an actuator arm. The actuators 408 can be controlled by a test computer 410. The test computer 410 can generate control signals that control a position of each actuator 408, as well as an intensity (e.g., magnitude) and direction of force applied by the actuators 408.

The forces applied by the actuators 408 to the vertical load structures 402 are converted into a torque (moment arm) on the flight control surface 402 and reacted by a control rod coupled to the flight control surface 402, as discussed herein. Similarly, the forces applied by the actuators 408 to the fore/aft load structures 406 are transferred to the flight control surface 402 to induce a tensile and/or compressive force on a hinge of the flight control surface 402. As discussed herein, the torque applied to the control surface and reacted by a control rod and the tensile and/or compressive force applied to the hinge of the flight control surface are decoupled from each other, such that these forces can be applied contemporaneously. The actuators 408 can also provide feedback signals to the test computer 410 that characterizes a response of the flight control surface 402 to the forces applied by vertical load structures 404 and the fore/aft load structures 406.

Sensors 412 can be positioned on or near the flight control surface 402 to measure a response of the flight control surface 402 to the forces applied by the vertical load structure 404 and the fore/aft load structures 406. The sensors 412 can provide sensor data to the test computer 410.

In a load test, the test computer 410 commands each of the actuators 408 to apply a specific force to a corresponding vertical load structure 404 or a fore/aft load structure 406. Moreover, in some examples, the test computer 410 can cause the first set of the actuators 408 to apply the specific forces to the corresponding vertical load structures 404 and the second set of the actuators to apply specific forces corresponding to the fore/aft load structures 406 contemporaneously since the vertical load structures 404 and the fore/aft load structures 406 apply forces that are decoupled from each other. In other examples, the test computer 410 can cause the actuators 408 to apply the specific forces to the corresponding vertical load structures 404 and the fore/aft load structures 406 in a sequenced manner.

The test computer 410 can record feedback signals from the actuators 404 and/or sensor data from the sensor 412. Over a duration of a test, the test computer 410 may cause the actuators 408 to apply hundreds or thousands of different intensities and directions of force to identify potential defects (or a lack thereof) in the flight control surface 402 and the associated wing or tail.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A load testing apparatus comprising:
   a plurality of vertical load structures arranged on a flight control surface to provide torque on the flight control surfaces and reacted by a control rod of the flight control surface; and
   a plurality of fore/aft load structures arranged to provide tensile and/or compressive force in a direction intersecting a hinge line of the flight control surface, wherein each of the plurality of fore/aft load structure comprises:
      a first rubber pad having a surface extending in a first plane that is arranged to contact a lower surface of the flight control surface; and
      a second rubber pad having a surface extending in a second plane that is arranged to contact an upper surface of the flight control surface, wherein the first plane and the second plane are non-parallel planes.

2. The load testing apparatus of claim 1, wherein the first rubber pad and the second rubber pad of each of the plurality of fore/aft load structures are bonded to the flight control surface to prevent relative movement between each respective fore/aft loading structure and the flight control surface.

3. The load testing apparatus of claim 2, wherein each of the plurality of fore/aft load structures further comprises:
   a first wedge structure adhered to the first rubber pad; and
   a second wedge structure adhered to the first rubber pad, wherein a given surface of the first wedge structure and a given surface of the second wedge structure extends in a direction parallel to the fore/aft load line of the flight control surface.

4. The load testing apparatus of claim 3, wherein each of the plurality of fore/aft load structures further comprises:
   a first elongated member attached to the first wedge structure, the first elongated member extending in the direction parallel to the fore/aft load line of the flight control surface;
   a second elongated member attached to the first wedge structure, the first elongated member extending in the direction parallel to the fore/aft load line of the flight control surface; and
   a third elongated member attached to the first elongated member and the second elongated member, the third elongated member extending in a direction perpendicular to the fore/aft load line of the flight control surface.

5. The load testing apparatus of claim 4, wherein each of the plurality of fore/aft load structures is configured to transfer a tensile force and/or a compressive force applied by an actuator arm on to the third elongated member of a respective fore/aft load structure to the flight control surface.

6. The load testing apparatus of claim 4, wherein each of the plurality of fore/aft load structures is configured to provide nearly equal tensile and/or compressive force on the lower surface and the upper surface of the flight control surface.

7. The load testing apparatus of claim 1, wherein each of the plurality of vertical load structures comprises a surface that extends in a plane parallel with the upper control surface.

8. The load testing apparatus of claim 7, wherein each of the plurality of vertical load structures comprises a rubber pad that is bonded to the flight control surface to prevent relative movement between the respective vertical load structure and the flight control surface.

9. The load testing apparatus of claim 8, wherein each of the plurality of vertical load structures further comprises a wedge structure adhered to the rubber pad of the respective vertical load structure that includes a surface extending in a direction perpendicular to a fore/aft load line of the flight control surface.

10. The load testing apparatus of claim 9, wherein each of the plurality of vertical load structures comprises an elongated member extending from the wedge structure in the direction perpendicular to the fore/aft load line of the flight control surface.

11. The load testing apparatus of claim 10, wherein the elongated member of the vertical load structure converts a compressive force or a tensile force applied by an actuator to the flight control surface into a torque on the flight control surface and reacted by a control rod of the flight control surface.

12. The load testing apparatus of claim 1, the plurality of vertical load structures and the plurality of fore-aft load structures are arranged in an intervening pattern across a length of the flight control surface.

13. The load testing apparatus of claim 12, wherein the flight control surface is an aileron for an aircraft.

14. The load testing apparatus of claim 12, wherein the flight control surface is a ruddervator of an aircraft.

15. A load testing apparatus comprising:
a plurality of vertical load structures arranged on a flight control surface to provide torque on the control surface and reacted by a control rod of the flight control surface; and
a plurality of fore/aft load structures arranged to provide tensile and/or compressive force in a direction intersecting the hinge line of the flight control surface, wherein the tensile force and/or compressive force and the torque on the flight control surface and reacted by the control rod are nearly independent of each other.

16. The load testing apparatus of claim 15, further comprising:
a first set of actuators that applies a compressive force on the plurality of vertical load structures; and
a second set of actuators that applies a tensile and/or a compressive force on the plurality of fore/aft load structures, wherein the first set of actuators and the second set of actuators operate contemporaneously.

17. The load testing apparatus of claim 15, wherein the flight control surface is one of an aileron and ruddervator for an aircraft.

18. The load testing apparatus of claim 15, wherein the plurality of vertical load structures and the plurality of fore-aft load structures are arranged in an intervening pattern across a length of the flight control surface.

19. A load testing apparatus comprising:
a plurality of vertical load structures arranged on a flight control surface to provide torque on the flight control surface and reacted by a control rod of the flight control surface, wherein each of the plurality of vertical load structures comprises a rubber pad that that is bonded to the flight control surface to prevent relative movement between the rubber pad and the flight control surface;
a plurality of fore/aft load structures arranged to provide tensile and/or compressive force in a direction intersecting a hinge line of the flight control surface, wherein each of the plurality of fore/aft structures comprises:
a first pad formed of a rubber material extending in a first plane that is arranged to contact a lower surface of the flight control surface; and
a second pad formed of the rubber material extending in a second plane that is arranged to contact an upper surface of the flight control surface, wherein the first plane and the second plane are non-parallel planes;
a first set of actuators that applies a compressive force on the plurality of vertical load structures, and the plurality of vertical load structures applies a torque on the flight control surface and reacted by the control rod; and
a second set of actuators that applies a tensile and/or a compressive force on the plurality of fore/aft load structures, and the plurality of fore/aft load structures transfers the tensile and/or compressive force to the flight control surface, wherein the first set of actuators and the second set of actuators operate contemporaneously.

20. The load testing apparatus of claim 19, wherein the flight control surface is one of an aileron and a ruddervator for an aircraft.

* * * * *